(12) United States Patent
Beucher et al.

(10) Patent No.: US 8,079,567 B2
(45) Date of Patent: Dec. 20, 2011

(54) REGULATED VALVE ASSEMBLY FOR FIRE EXTINGUISHING SYSTEMS

(75) Inventors: Stéphane Beucher, Sartrouville (FR); Bernard Dusser, Saint Martin de Nigelles (FR); Nicolas Giraud, Neauphle le Chateau (FR)

(73) Assignee: Siemens S.A.S, Saint-Denis Cedex (FR)

( * ) Notice: Subject to any disclaimer, the term of this patent is extended or adjusted under 35 U.S.C. 154(b) by 715 days.

(21) Appl. No.: 11/886,892

(22) PCT Filed: Apr. 13, 2005

(86) PCT No.: PCT/FR2005/000892
§ 371 (c)(1),
(2), (4) Date: Nov. 4, 2008

(87) PCT Pub. No.: WO2006/108931
PCT Pub. Date: Oct. 19, 2006

(65) Prior Publication Data
US 2009/0211771 A1      Aug. 27, 2009

(51) Int. Cl.
*F16K 31/12* (2006.01)
*A62C 37/36* (2006.01)
(52) U.S. Cl. ............. 251/28; 169/19; 251/25; 251/31
(58) Field of Classification Search ............ 251/25, 251/28, 29, 30.02, 30.05, 31; 169/19, 20, 169/22; 137/488
See application file for complete search history.

(56) References Cited

U.S. PATENT DOCUMENTS

| | | | |
|---|---|---|---|
| 2,111,230 A * | 3/1938 | Toussaint | 251/28 |
| 2,398,775 A | 4/1946 | Beekley et al. | |
| 3,980,270 A * | 9/1976 | Thomas | 251/30.01 |
| 4,516,600 A | 5/1985 | Sturman et al. | |
| 5,653,291 A * | 8/1997 | Sundholm | 169/20 |
| 6,871,802 B2 * | 3/2005 | Stilwell et al. | 239/583 |
| 7,134,447 B2 * | 11/2006 | Boyer | 137/491 |

FOREIGN PATENT DOCUMENTS

WO    WO 2004/079678 A2    9/2004

\* cited by examiner

*Primary Examiner* — John Fristoe, Jr.
*Assistant Examiner* — Jessica Cahill
(74) *Attorney, Agent, or Firm* — Laurence A. Greenberg; Werner H. Stemer; Ralph E. Locher

(57) ABSTRACT

A valve assembly has a valve body having an inlet section for a pressurized fluid and an outlet. A piston is movable within the valve body between an open position and a closed position blocking fluid communication. The piston has an end section, a sealing section and a middle section located between the end section and the sealing section. A cavity receives the piston within the valve body. The cavity has a superior chamber, an intermediate chamber, and an inferior chamber. A spring within the superior chamber exerts a spring force onto the piston to urge the piston towards the open position. An actuator device provides upon actuation for a first flow of fluid outside the cavity from the inlet section to the superior chamber. The first flow causes a pressure within the superior chamber to increase until it is about the same as the pressure within the container so that the spring force moves the piston to the open position. In the open position a main flow of fluid flows from the inlet section via the intermediate chamber to the outlet.

13 Claims, 5 Drawing Sheets

REGULATED VALVE ASSEMBLY FOR FIRE EXTINGUISHING SYSTEMS

CROSS-REFERENCE TO RELATED APPLICATIONS

The present application is a national phase application of international application no. PCT/FR2005/000892, filed on Apr. 13, 2005, which is hereby incorporated by reference.

BACKGROUND OF THE INVENTION

The various embodiments described herein generally relate to a regulated valve assembly. More particularly, the embodiments relate to a valve assembly and a method for outputting a fluid at a predetermined level of pressure.

In an exemplary field of use, a valve assembly is part of a fire extinguishing system. International application PCT/US2003/040827 discloses a low pressure inert gas hazard suppression system for protecting a room from fire or other hazard. The system includes several pressurized inert gas cylinders each equipped with a valve unit and retaining inert gas at a pressure of in the order of 300 bar. Each valve unit is coupled via a conduit to a delivery manifold. The valve units are operable to deliver gas from the cylinders at a pressure around 10-100 bar throughout a substantial portion of the time of gas delivery. Each valve unit has a valve body and a shiftable sealing member having channels and a gas passageway that allow gas from the cylinder to enter equalization and modulation chambers. Gas pressure from the cylinder and a spring assembly bias the member to the valve open position. This is counterbalanced by gas pressure within the equalization and modulation chambers. When a hazard is detected, the valve units are actuated by draining of gas from the modulation chambers, allowing gas flow from the cylinders. As the gas discharge proceeds, gas flows into and out of the modulation chambers so as to achieve the constant pressure gas output. Near the end of the gas discharge, the spring assembly becomes predominant and holds the valve unit open until all gas is discharged.

SUMMARY OF CERTAIN INVENTIVE ASPECTS

In the valve unit disclosed in PCT/US2003/040827, the pressure within the equalization and modulation chambers is caused by gas entering the sealing member at openings at a lower end and then flowing through passages within the sealing member into the chambers. During the gas discharge, the gas flow between the inlet and the outlet passes these openings. The openings are therefore exposed to a dynamic pressure that affects the flow of gas to the chambers and the pressure within these chambers. This negatively influences the regulation of the valve and the output pressure of the valve. It is, therefore, an object of the various embodiments described herein to improve a valve assembly so that the output pressure is more constant within a predetermined time.

Accordingly, one aspect involves a valve assembly having a valve body that has an inlet section for coupling to a container for a fluid under pressure and an outlet for coupling to a piping system. A piston is movable within the valve body along a first axis between an open position allowing fluid communication between the inlet section and the outlet, and a closed position blocking the fluid communication. The piston has an end section, a sealing section and a middle section located between the end section and the sealing section. A cavity extends along the first axis and receives the piston within the valve body. The cavity has a superior chamber between the end section and the middle section, an intermediate chamber between the middle section and the sealing section, and an inferior chamber between a wall of the cavity and the sealing section. The piston is configured to prevent an exchange of fluid between the chambers. A spring is located within the superior chamber and configured to exert a spring force onto the piston to urge the piston towards the open position. An actuator device is coupled to the valve body and configured to provide upon actuation for a first flow of fluid outside the cavity from the inlet section to the superior chamber. The first flow causes a pressure within the superior chamber to increase until it is about the same as the pressure within the container so that the spring force moves the piston to the open position. In the open position a main flow of fluid flows from the inlet section via the intermediate chamber to the outlet.

BRIEF DESCRIPTION OF THE SEVERAL VIEWS OF THE DRAWINGS

These and other aspects, advantages and novel features of the embodiments described herein will become apparent upon reading the following detailed description and upon reference to the accompanying drawings. In the drawings, same elements have the same reference numerals.

DETAILED DESCRIPTION OF CERTAIN INVENTIVE EMBODIMENTS

Figure 1:
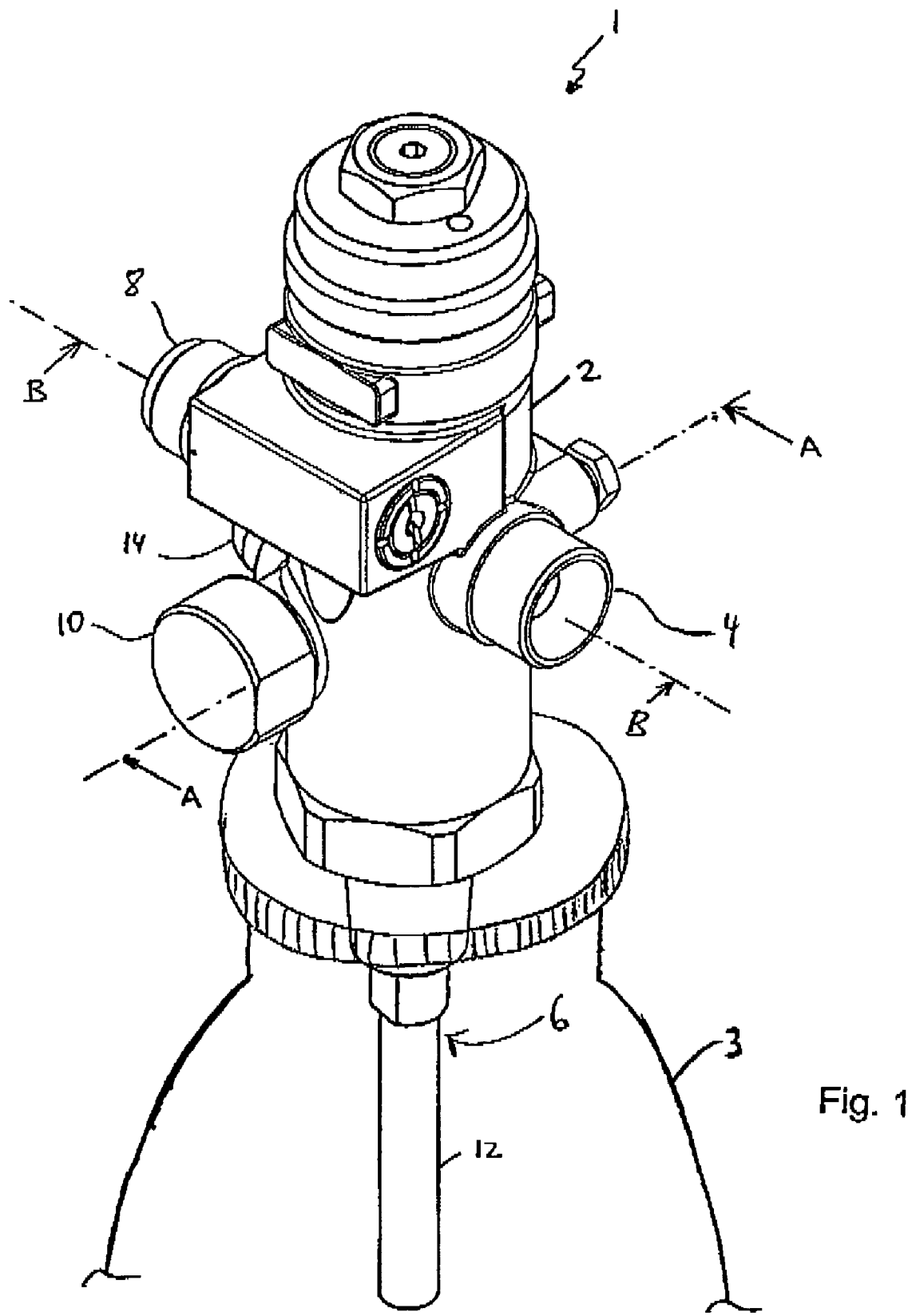
FIG. 1 is a perspective view of one embodiment of a valve assembly.

FIG. 1 shows a schematic illustration of one embodiment of a valve assembly 1. The illustration depicts various external features of the valve assembly 1 for an exemplary use in connection with a fire safety system. In one embodiment of a fire safety system, the valve assembly 1 is coupled to a fluid reservoir and a piping system configured to deliver the fluid to one or more sites, for example, rooms within a building. The reservoir may be a heavy-duty metallic cylinder 3 that retains the fluid at a pressure of between about 200 bar and about 500 bar, for example, at 300 bar. The fluid may be an agent that suppresses and/or extinguishes a fire. For example, the fluid may include an inert gas (e.g., nitrogen, argon), or a mixture of two or more inert gases, or any other fluid having fire extinguishing or suppressing properties.

Figure 8:
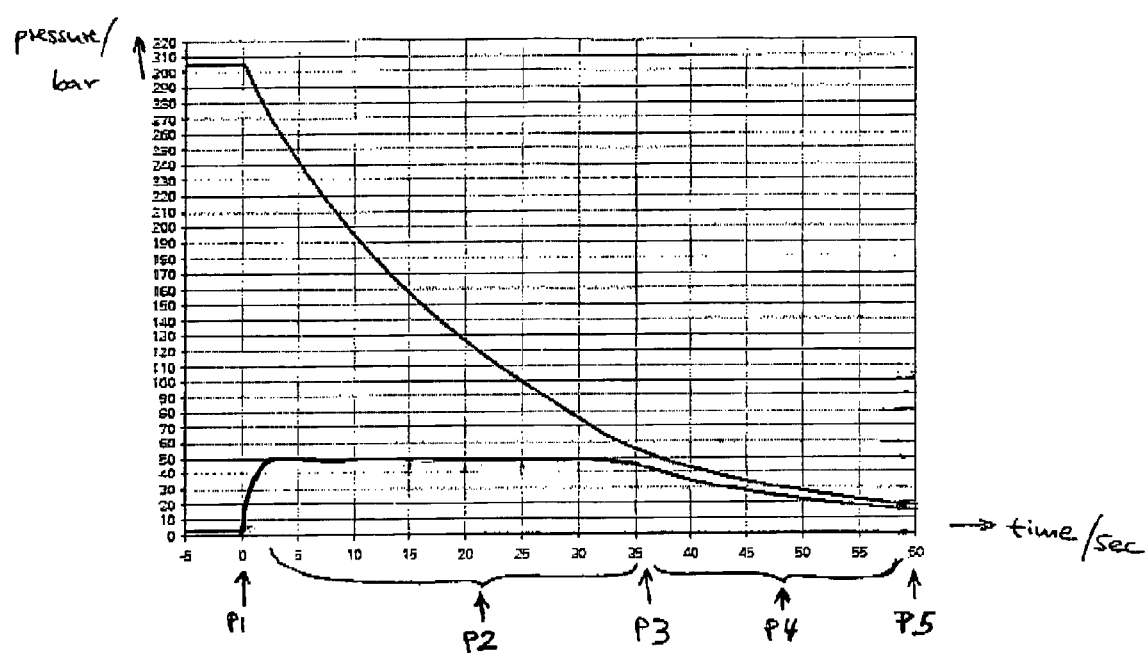
FIG. 8 is a graph illustrating the fluid pressure in the cylinder and the output pressure, each as a function of time.

In operation, for example, upon detection of excessive heat, smoke or fire, the valve assembly 1 is activated to release the fluid within a predetermined period of time at a substantially constant pressure that is lower than the fluid's pressure within the cylinder 3. The valve assembly 1 may output the fluid at a substantially constant pressure of between about 10 and about 100 bar within about one to several minutes. In one embodiment, the valve assembly 1 outputs the fluid at a substantially constant pressure of about 50 bar within about 40 seconds, as illustrated in FIG. 8 and described below in more detail. Those of ordinary skill in the art will appreciate that the valve assembly 1 may not only be used in connection with a fire safety system, but may in fact be used in any system where a fluid under high pressure is to be released at a substantially constant lower pressure within a predetermined period of time.

The valve assembly 1 is for illustrative purposes in FIG. 1 coupled to the cylinder 3 and includes a valve body 2. The valve body 2 has a generally elongate shape with a bottom section and an opposing top section. Throughout the present description, relational terms like "bottom", "top", "below", "downwards", or the like, are used without limitation to refer to features of the valve assembly 1 while the valve assembly 1 is in the upright or substantially vertical position. However, it is understood by those of ordinary skill in the art that such terms equally apply when the valve assembly 1 is placed in another orientation. In use, the bottom section is near the cylinder 3 and includes an external threading to screw the valve assembly 1 to the cylinder 3. In one embodiment, the valve body 2 is made of brass.

Further, the valve assembly 1 includes an actuator device 8, an inlet section 6 including a tube 12, an outlet 4, a port 10, for example, for a manometer, and a safety device 14, for example, a disc that ruptures at a predetermined pressure. The inlet section 6 extends in the illustrated embodiment into an upper part of the cylinder 3. The outlet 4 is configured to couple to the piping system of the fire safety system. The actuator device 8 is located at a side of the valve body 2 and may be triggered through a signal from a central station or a fire detection system that activates a triggering-mechanism (e.g., pneumatic, electric, mechanic) that exerts a force upon the actuator device 8 (see, e.g., arrow T in FIG. 6).

Figure 2:
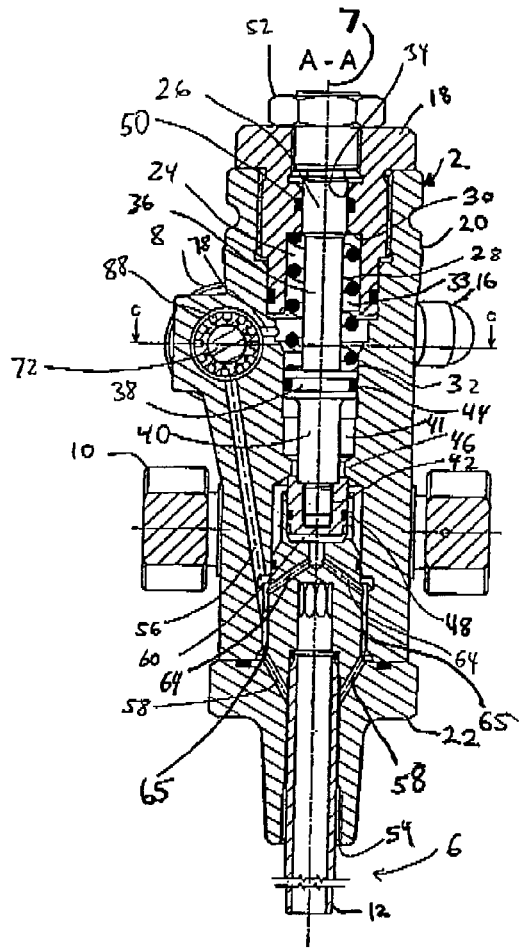
FIG. 2 is a vertical sectional view of the valve assembly along line A-A of FIG. 1 in a closed position.
Figure 7:
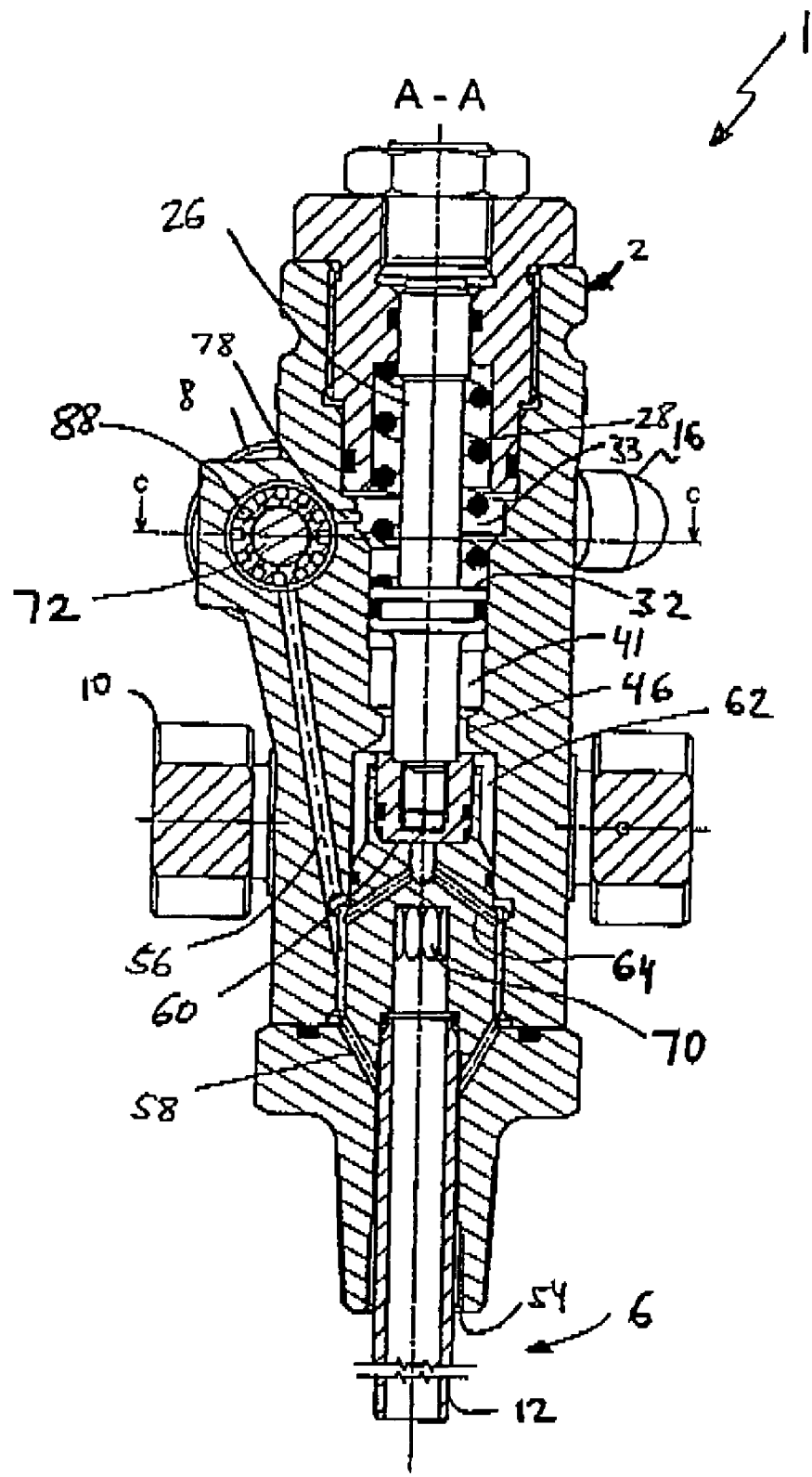
FIG. 7 is a vertical sectional view of the valve assembly along line A-A of FIG. 1 in an open position.

FIG. 2 is a vertical sectional view of the valve assembly 1 along line A-A of FIG. 1 in a closed position. An upper part 18 and a bottom part 22 are connected to a middle part 20, and essentially form the valve body 2. The parts 18, 20, 22 may be connected by means of screwing and sealing the parts 18, 22 to the middle part 20. An elongate and circular cavity 24 exists within the parts 18, 20 and extends along a vertical axis 7 from the upper part 18 through the middle part 20. The cavity 24 is configured to contain a piston 26 that is movable within the cavity 24 along the axis 7 and between a closed position (FIGS. 2-4) and an open position (FIGS. 5 and 7).

The piston 26 is of a solid construction and has a generally elongate form with several sections: an end section 34, first and second main sections 36, 40, a middle section 38 and a sealing section 42. The sealing section 42 is opposite to the end section 34 and connected to the second main section 40. The first main section 36 connects the end section 34 and the middle section 38, which is further connected to the second main section 40. The middle section 38 is circular and has a diameter selected to correspond to a diameter of the cavity 24. An O-ring 44 is fitted onto a circumference of the middle section 38 to contact an interior wall of the cavity 24. The diameters of the end, main and sealing sections 34, 36, 40, 42 are smaller than that of the middle section 38, whereas the diameter of the sealing section 42 is larger than the diameter of the second main section 40.

For illustrative purposes, the cavity 24 may be viewed as encompassing an upper cavity and a lower cavity divided by a constriction 46. The upper cavity contains the end section 34, the first main section 36, the middle section 38 and a substantial part of the second main section 40. The second main section 40 extends through the constriction 46 and into the lower cavity, which includes the sealing section 42. The constriction 46 has a diameter that is bigger than the diameter of the second main section 40, but smaller than the diameter of the sealing section 42. The constriction 46 and the sealing section 42 block and unblock fluid communication between the inlet section 6 and the outlet 4.

In one embodiment, the sealing section 42 includes a polymer part (e.g., PE, HDPE, ABS), that is fixed to the solid material of the piston 26. The polymer part of the sealing section 42 has a diameter selected to correspond to a diameter of the lower cavity. An O-ring 48 is fitted onto a circumference of the polymer part to contact an interior wall of the lower cavity.

The upper cavity includes a spring 28 that extends between a rim 30 in the upper part 18 and an upper surface 32 of the middle section 38. The section of the upper cavity in which the spring 28 is located is referred to superior chamber 33. The spring 28 is configured to urge the piston 26 downwards and to move the polymer part of the sealing section 42 away from the constriction 46, i.e., the spring 28 urges the piston 26 towards the open position.

The upper cavity includes further a section that extends between the middle section 38 and a zone defined by the constriction 46. This section is hereinafter referred to as intermediate chamber 41.

Within the upper part 18, the cavity 24 has a reduced-diameter part sized to support the end section 34 of the piston 26. The reduced-diameter part of the cavity 24 is selected to correspond to the diameter of the end section 34. An O-ring 50 is fitted onto a circumference of the end section 34 to contact an interior wall of the reduced-diameter part of the cavity 24. A stop screw 52 closes the cavity 24 and restricts vertical movement of the piston 26 within the cavity 24.

It is contemplated that the piston 26 and the cavity 24 are sized to allow vertical movement of the piston 26 within the cavity 24. More particularly, the end section 34, the middle section 38 and the sealing section 42 together with the respective O-rings 50, 44, 48 are configured to support the piston 26 within the cavity 24 and to contact the adjacent interior walls of the cavity 24, yet to allow vertical movement of the piston 26.

In addition to the piston 26 and the cavity 24, the valve body 2 includes several channels for fluid communication. In one embodiment, and as part of the inlet section 6, the bottom part 22 includes an inlet channel 54, which is divided into two parts, that extends in one embodiment along the tube 12 and in proximity of the inlet section 6 on opposite sides of the tube 12. Further away from the inlet section 6, the channel 54 extends along and around the tube 12. The channel 54 receives fluid from the cylinder 3 to set a pilot flow with an associated pilot pressure during operation of the valve assembly 1, as described below. Two channels 58 within the bottom part 22 are in fluid communication with the inlet channel 54.

A space in an area where the bottom part 22 and the middle part 20 are connected forms a channel 65, which is divided into two parts. The bottom part 22 includes further a channel 64 that extends from the channel 65 to an inferior chamber 60 of the cavity 24.

The middle part 20 includes a channel 56 that is in fluid communication with the channel 58 of the bottom part 22 via the two parts of channel 65. The channel 56 extends between the two channel 65 and the actuator device 8. The inferior chamber 60 exists between a bottom of the sealing section 42 and bottom and side walls of the cavity 24, and is in fluid communication with the channel 64.

The channels 54, 58, 64, 65 cause the fluid to enter the inferior chamber 60 and to exert the pilot pressure onto the piston 26. The pilot pressure is about the same as the pressure in the cylinder 3, for example, 300 bar when the cylinder 3 is still full. It is contemplated that the pilot pressure follows the pressure in the cylinder 3. Among other functions, the pilot pressure urges the piston 26 upwards so that the sealing section 42 closes the constriction 46.

Figure 3:
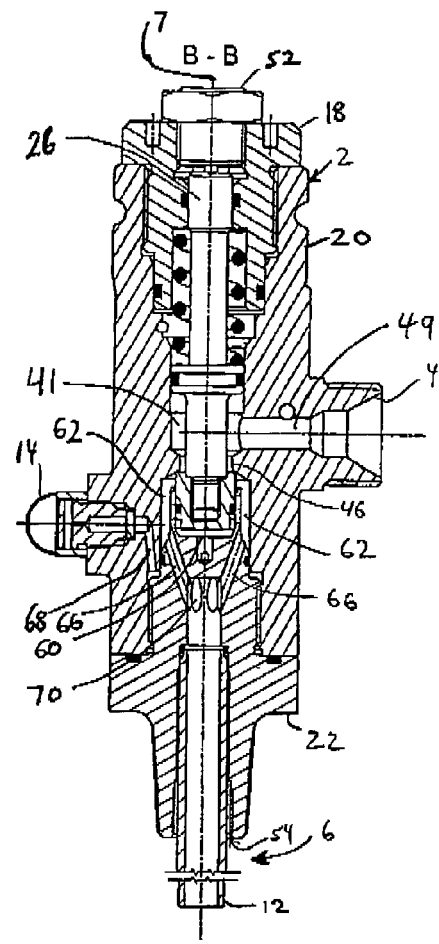
FIG. 3 is a vertical sectional view of the valve assembly along line B-B of FIG. 1 in a closed position.

FIG. 3 is a vertical sectional view of the valve assembly 1 along line B-B of FIG. 1. This view depicts additional channels in the middle part 20 of the valve body 2. A channel 62 extends between the middle part 20 and the lower part 22 in an area around the lower cavity, i.e., the part of the cavity 24 below the constriction 46. Several separate channels 66, in one embodiment eight channels, extend between the channel 62 and eight openings 70 near an upper end of the tube 12. The channel 62 is coupled to the lower cavity and the channels 66 and the openings 70. In operation, the channels 62, 66 cause the fluid to enter the cavity 24 and to exit the cavity 24 via the outlet 4 at the predetermined level of pressure, for example, of about 50 bar. Hence, when the valve assembly 1 is in the open position, the fluid flows from the cylinder 3, through the tube 12, the openings 70 and the channels 66, 62 to the outlet 4. This flow constitutes a main flow of the valve assembly 1 and is separate from the fluid in the channels 54, 56, 58, 64, 65.

Figure 4:
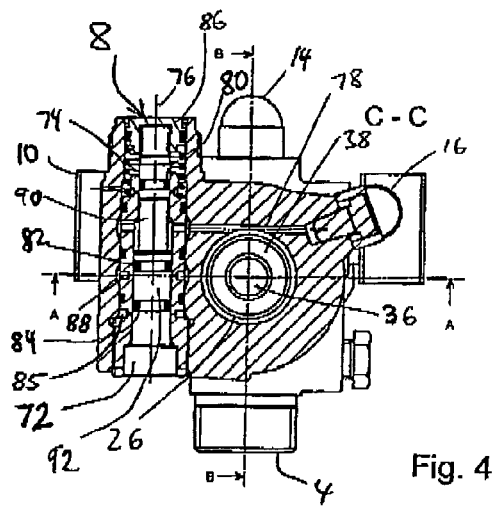
FIG. 4 is a horizontal sectional view of the valve assembly along line C-C of FIG. 2.
Figure 5:
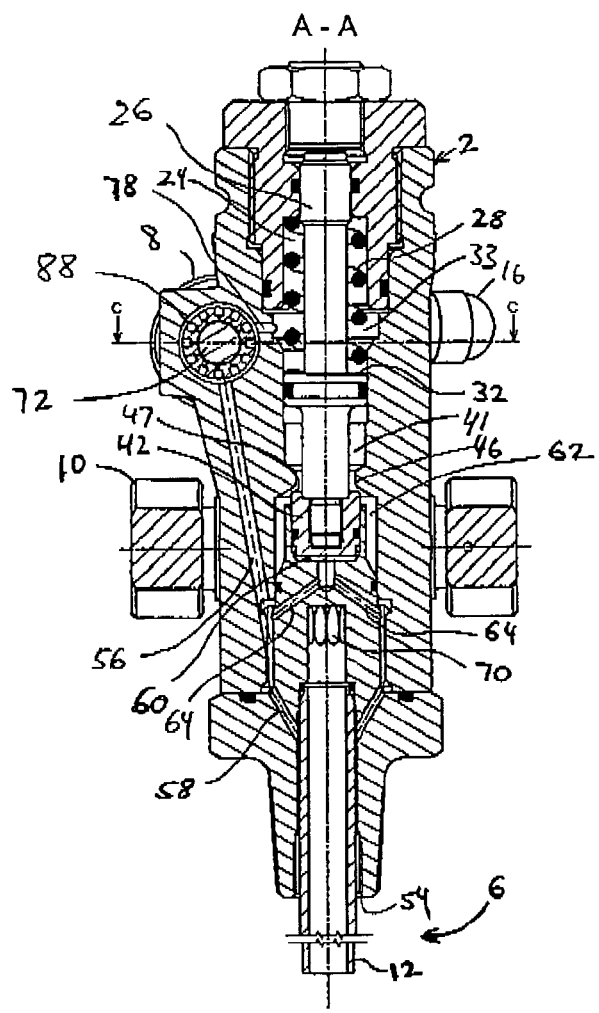
FIG. 5 is a vertical sectional view of the valve assembly along line A-A of FIG. 1 in a regulated position.

FIG. 4 is a horizontal sectional view of the valve assembly 1 along line C-C of FIG. 2 to illustrate the actuator device 8 in more detail. The actuator device 8 includes a piston 72 positioned within a bore and configured to move in the bore along an axis 76 that is substantially perpendicular to the axis 7 along which the piston 26 is moveable. In proximity to an activation section 86 of the actuator device 8 a spring 74 urges the piston 72 into an inactive position in which the piston 72 rests substantially inside the bore. The actuator device 8 can be activated by applying a force to the activation section 86 (see arrow T in FIG. 6) to compress the spring 74 and to push the piston 72 to an active position illustrated in FIG. 6.

The piston 72 has O-rings 80, 82, 84 mounted to its circumference to define various sections 90, 92. The section 90 exists between the O-ring 80 and the O-ring 82, and the section 92 exists between the O-ring 82 and the O-ring 84. In the inactive position shown in FIG. 4, fluid may enter the space defined by the section 92 through several openings 88. In embodiment, twelve openings 88 each having a diameter of about 0.2 mm surround the piston 72 and are in fluid communication with the channel 56. As the O-rings 82, 84 seal the section 92 the fluid may not escape the space defined by the section 92.

In summary, FIGS. 2-4 depict the valve assembly 1 in the closed position. In the closed position, the cylinder 3 retains the fluid at a pressure of about 300 bar. The fluid in the channels 56, 58, 64, 65 and the chamber 60 is substantially under the same pressure of about 300 bar and presses the piston 26 upwards against the force of the spring 28, which urges the piston 26 downwards towards to the open position. As the force caused by the fluid pressure is higher than the spring force, the sealing section 42 is pressed against the constriction 46 maintaining the valve assembly 1 in the closed position. It is contemplated that the upper cavity, including the superior chamber 33; is substantially free of fluid when the valve assembly 1 is in the closed position.

To describe the operation of the valve assembly 1 reference is made to FIGS. 5-8. More particularly, the activation and regulation of the valve assembly 1 is described with reference to FIG. 5, which is a vertical sectional view of the valve assembly 1 along line A-A of FIG. 1, and FIG. 6, which is a horizontal sectional view of the valve assembly 1 along line C-C of FIG. 5. The final position of the valve assembly 1 is shown in FIG. 5, which is a vertical sectional view of the valve assembly 1 along line A-A of FIG. 1. Reference is further made to FIG. 8, which is a graph illustrating the fluid pressure in the cylinder 3 as well as the output pressure, each as a function of time.

Figure 6:
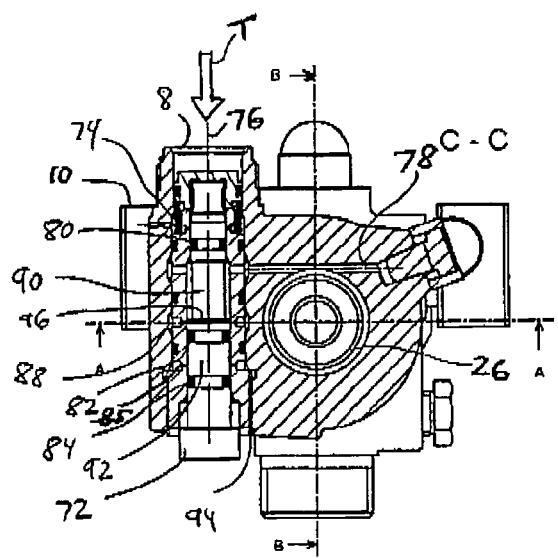
FIG. 6 is a horizontal sectional view of the valve assembly along line C-C of FIG. 5.

During a first phase of the activation (see P1 in FIG. 8), a triggering force is applied to the piston 72 to compress the spring 74 and to move the piston 72 along the axis 76. In FIG. 6, the direction of the applied triggering force is indicated through an arrow T. With the piston 72 the O-rings 80, 82, 84 move as well. During this movement, the O-ring 82 moves beyond the area of the twelve openings 88, and fluid within the section 92 escapes through several (for example, four) openings 85 and a channel 94 formed around the piston 72. As the O-ring 82 no longer seals the passage of fluid, the fluid enters the space around the section 90 and passes through the channel 78 into the superior chamber 33 of the cavity 24.

In one embodiment, once triggered, the process of activating the valve assembly 1 cannot be stopped, even if the triggering force is removed. This is because the fluid pressure acts on a surface 96 of a ridge of the piston 72 and locks the position of the piston 72. The fluid pressure in the superior chamber 33 pushes the piston 26 downwards with the same force as the fluid pressure in the inferior chamber 60 presses the piston 26 upwards. The balance of the forces results because the same pressures act upon equivalent surfaces. Any residual fluid pressure, which was blocked by the O-rings 82, 84, is evacuated by the four openings 85 and the channel 94.

During a second phase of the activation, the forces caused by the fluid pressures in the inferior chamber 60 and the superior chamber 33 cancel themselves. The force of the spring 28 remains and pushes the piston 26 downwards to move the sealing section 42 away from the constriction 46 opening the valve assembly 1. The fluid flows now through the tube 12 and the channels 62, 66 (FIG. 3) to a passage 47 (FIG. 5) created by the opening between the sealing section 42 and the constriction 46. The fluid enters the intermediate chamber 41 between the sealing section 42 and the middle section 38.

A passageway 49 (FIG. 3) connects the output 4 and the intermediate chamber 41. The diameter of the passageway 49 is smaller than the diameter of the outlet 4 in use connected to a piping system. The restriction caused by the passageway 49 causes the fluid pressure to increase in the intermediate chamber 41. The increased fluid pressure continues to act upon the piston 26 regardless of the flow rate ($m^3$/sec) in the piping system coupled to the output 4.

Upon activation, the valve assembly 1 is configured to regulate the output of the fluid (see P2 in FIG. 8). At the beginning, i.e., shortly after activation, the piston 26 moves only slightly, for example, a few tenths of a millimeter. The piston 26 is subject to two opposing forces: the force of the spring 28 and the force caused by the fluid pressure in the intermediate chamber 41, which corresponds to the pressure of the coupled piping system. As the fluid pressure increases in the intermediate chamber 41 due to fluid flowing in through the passage 47, the force acting upon the piston 26 from below becomes higher than the spring force that urges the sealing section 42 towards the constriction 46 to close the valve assembly 1. As a consequence, the pressure in the intermediate chamber 41 decreases because the outflow through the outlet 4 is greater than the inflow into the intermediate chamber 41. As the pressure decreases, the force acting upon the piston 26 from below becomes lower than the spring force so that the spring force is sufficient to urge the piston 26 downwards to open the valve assembly 1. This causes the fluid pressure to increase again in the intermediate chamber 41.

During the discharge process, the pressure in the cylinder 3 decreases and approaches the fluid pressure at the outlet 4. At a certain point in time (see P3 in FIG. 8), the cylinder pressure is about the same as the fluid pressure at the outlet 4 The spring force becomes higher than the force caused by the fluid pressure in the intermediate chamber 41, and fully opens the valve assembly 1 (see P 3 in FIG. 8).

The fluid pressure at the outlet 4 then follows the decreasing fluid pressure in the cylinder 3 (see P4 in FIG. 8). It is contemplated that the pressures in the inferior chamber 60 and the superior chamber 33 follow the decreasing fluid pressure in the cylinder 3.

In FIG. 7, the illustrated embodiment of the valve assembly 1 is in the final position. The cylinder 3 is essentially empty or at least the fluid pressure in the cylinder 3 has been substantially reduced (see P5 in FIG. 8). In the illustrated final position, the spring 28 urges the piston 26 downwards so that it touches the bottom of the lower cavity. As soon as there is no more pressure in the cylinder 3, the spring 74 of the activation device 8 urges the piston 72 back to its initial position.

It is apparent that there has been disclosed a valve assembly 1 that fully satisfies the objects, means, and advantages set forth hereinbefore. While specific embodiments of the valve assembly 1 have been described, it is evident that many alternatives, modifications, and variations will be apparent to those skilled in the art in light of the foregoing description.

We claim:

1. A valve assembly comprising:
   a valve body that has an inlet section for coupling to a container for a fluid under pressure and an outlet for coupling to a piping system,
   a piston movable within the valve body along a first axis between an open position allowing fluid communication between the inlet section and the outlet, and a closed position blocking said fluid communication, the piston having an end section, a sealing section and a middle section located between the end section and the sealing section,
   a cavity extending along the first axis and configured to receive the piston within the valve body, the cavity has a superior chamber between the end section and the middle section, an intermediate chamber between the middle section and the sealing section, and an inferior chamber between a wall of the cavity and the sealing section, wherein the piston is configured to prevent an exchange of fluid between the chambers,
   a spring located within the superior chamber and configured to exert a spring force onto the piston to urge the piston towards the open position, and
   an actuator device coupled to the valve body and configured to provide upon actuation for a first flow of fluid outside the cavity from the inlet section to the superior chamber, the first flow causing a pressure within the superior chamber to increase until it is about the same as the pressure within the container so that the spring force moves the piston to the open position, wherein in the open position a main flow of fluid flows from the inlet section via the intermediate chamber to the outlet.

2. The valve assembly of claim 1, wherein the piston includes a solid stem.

3. The valve assembly of claim 2, wherein the sealing section includes a polymer part attached to the solid stem.

4. The valve assembly of claim 1, wherein the inlet section includes a tube that extends along the first axis and guides the main flow.

5. The valve assembly of claim 4, further comprising first and second main flow channels between the tube and the intermediate chamber to guide the main flow.

6. The valve assembly of claim 5, wherein the tube has six openings, each coupled to one of the first main flow channels.

7. The valve assembly of claim 4, wherein the inlet section includes an inlet channel extending along the tube and configured for guiding the first flow of fluid.

8. The valve assembly of claim 7, further comprising first, second, third and fourth pilot channels, wherein the first, second and third pilot channels are coupled between the inlet channel and the inferior chamber and cause a pressure within the inferior chamber that urges the piston to the closed position, and wherein the fourth pilot channel is coupled between the actuator device and the second pilot channel to guide the first flow of fluid to the actuator device.

9. The valve assembly of claim 1, wherein the actuator device includes an actuator piston movable within a bore along a second axis, which is substantially perpendicular to the first axis, and between a first position that blocks passage of the first flow of fluid and a second position that allows passage of the first flow of fluid to the superior chamber.

10. The valve assembly of claim 9, further comprising a channel coupled between the actuator device and the superior chamber to guide the first flow of fluid to the superior chamber.

11. A method of operating a valve assembly to output a fluid at a substantially constant pressure within a predetermined period of time, the valve assembly including a valve body having an inlet section coupled to a container for a fluid under pressure and an outlet coupled to a piping system, a piston movable within the valve body between an open position allowing fluid communication between the inlet section and the outlet, and a closed position blocking said fluid communication, a cavity extending along the first axis and configured to receive the piston within the valve body, a spring within the cavity and configured to exert a spring force onto the piston to urge the piston towards the open position, and an actuator device coupled to the valve body, the method comprising:
   feeding fluid from the container to an inferior chamber located between an interior wall of the cavity and the piston to exert a force that urges the piston to the closed position;
   activating the actuator device to cause a first flow of fluid along a path outside the cavity to enter a superior chamber, which exists between an upper wall of the cavity and middle section of the piston, to increase a first pressure within the superior chamber until it is about the same as the pressure in the container; and
   moving the piston to the open position to cause a main flow of fluid from the inlet section via an intermediate chamber to the outlet, wherein the intermediate chamber exists between the middle section and a sealing section of the piston.

12. The method of claim 11, further comprising increasing a pressure within the intermediate chamber, said pressure acting against said moving of the piston to the open position and tending to close the valve assembly.

13. The method of claim 12, wherein tending to close the valve assembly causes the pressure within the intermediate chamber to decrease so that the piston moves again towards the open position.

* * * * *